United States Patent
Rose et al.

(10) Patent No.: US 7,407,186 B2
(45) Date of Patent: Aug. 5, 2008

(54) AIRBAG CUSHION CONSTRUCTION

(75) Inventors: Larry D. Rose, South Weber, UT (US); Ronald B. Casper, West Jordan, UT (US); Trudy Lewis, West Haven, UT (US)

(73) Assignee: Autoliv ASP, Inc., Ogden, UT (US)

( * ) Notice: Subject to any disclaimer, the term of this patent is extended or adjusted under 35 U.S.C. 154(b) by 284 days.

(21) Appl. No.: 11/089,100

(22) Filed: Mar. 24, 2005

(65) Prior Publication Data

US 2006/0214405 A1  Sep. 28, 2006

(51) Int. Cl.
*B60R 21/16* (2006.01)
*B60R 21/231* (2006.01)

(52) U.S. Cl. .................................... 280/743.1
(58) Field of Classification Search ............... 280/743.1
See application file for complete search history.

(56) References Cited

U.S. PATENT DOCUMENTS

| | | | | |
|---|---|---|---|---|
| 3,888,504 A | * | 6/1975 | Bonn et al. ............... | 280/743.1 |
| 5,423,273 A | * | 6/1995 | Hawthorn et al. ........... | 112/441 |
| 5,520,414 A | | 5/1996 | Bishop .................... | 280/743.1 |
| 5,533,755 A | | 7/1996 | Nelsen et al. ............. | 280/743.1 |
| 5,720,234 A | * | 2/1998 | Hammer ................. | 112/475.08 |
| 5,931,498 A | | 8/1999 | Keshavaraj ............... | 280/743.1 |
| 6,129,382 A | * | 10/2000 | Tonooka .................. | 280/743.1 |
| 6,299,206 B1 | | 10/2001 | Keshavaraj ............... | 280/743.1 |
| 6,375,219 B2 | | 4/2002 | Keshavaraj ............... | 280/743.1 |
| 6,439,606 B2 | * | 8/2002 | Okada et al. .............. | 280/743.1 |
| 6,494,484 B2 | * | 12/2002 | Bosgieter et al. .......... | 280/743.1 |
| 6,560,832 B2 | | 5/2003 | Keshavaraj ................... | 28/143 |
| 6,666,477 B1 | * | 12/2003 | Robertson et al. ......... | 280/743.1 |
| 6,832,779 B2 | | 12/2004 | Tajima et al. ............. | 280/743.1 |
| 6,837,517 B2 | | 1/2005 | Keshavaraj ............... | 280/743.1 |
| 6,962,363 B2 | * | 11/2005 | Wang et al. ................ | 280/729 |
| 7,083,194 B2 | * | 8/2006 | Ritter ....................... | 280/743.1 |
| 7,201,397 B2 | * | 4/2007 | Keshavaraj ............... | 280/743.1 |
| 7,354,063 B2 | * | 4/2008 | Keshavaraj ............... | 280/743.1 |
| 2008/0084053 A1 | * | 4/2008 | Bouquier et al. .......... | 280/743.1 |

FOREIGN PATENT DOCUMENTS

GB  2 390 574  1/2004

* cited by examiner

*Primary Examiner*—Kevin Hurley
*Assistant Examiner*—Joselynn Y. Sliteris
(74) *Attorney, Agent, or Firm*—Sally J Brown; Stoel Rives LLP

(57) ABSTRACT

Disclosed are embodiments of methods and apparatus relating to automotive airbags. In one embodiment of the invention, an airbag cushion is provided having four primary panels. A front panel is provided having a substantially rectangular front face. Two substantially triangular side faces are positioned opposite from one another in the inflated airbag cushion, both of which are connected with the front panel. A rear panel including an upper rear face and a lower rear face is also provided. The upper rear face is connected to a first side of both the first and second side faces and the lower rear face is connected to a second side of both the first and second side faces.

31 Claims, 5 Drawing Sheets

AIRBAG CUSHION CONSTRUCTION

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which.

DETAILED DESCRIPTION OF PREFERRED EMBODIMENTS

Described below are embodiments of methods and apparatus relating to automotive airbags. In the following description, numerous specific details are provided for a thorough understanding of the embodiments of the invention. However, those skilled in the art will recognize that the invention can be practiced without one or more of the specific details, or with other methods, components, materials, etc.

In addition, in some cases, well-known structures, materials, or operations are not shown or described in detail in order to avoid obscuring aspects of the invention. Furthermore, the described features, structures, or characteristics may be combined in any suitable manner in one or more embodiments.

In one embodiment of the invention, an airbag cushion is provided that, upon inflation, includes a front panel having a substantially rectangular front face, and first and second substantially triangular side faces connected with the front panel. The airbag cushion may also include a rear panel having an upper rear face and a lower rear face. The upper rear face may be connected to a first side of both the first and second side faces and the lower rear face may be connected to a second side of both the first and second side faces.

Figure 1:
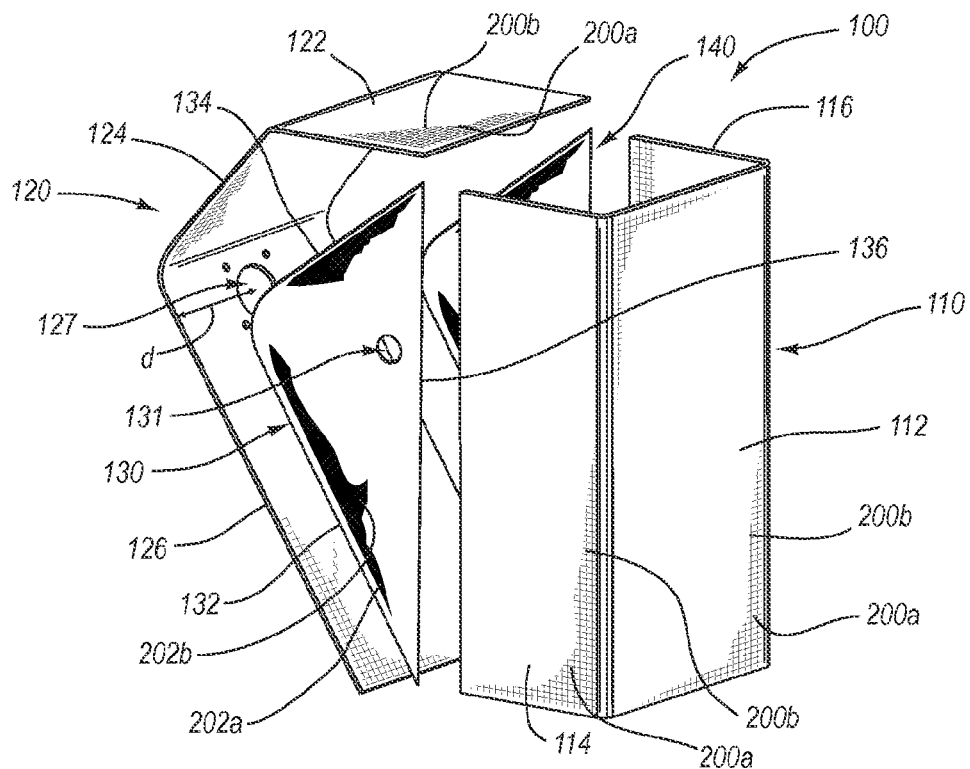
FIG. 1 is an exploded perspective view showing the panels of an embodiment of an airbag cushion.
Figure 3:
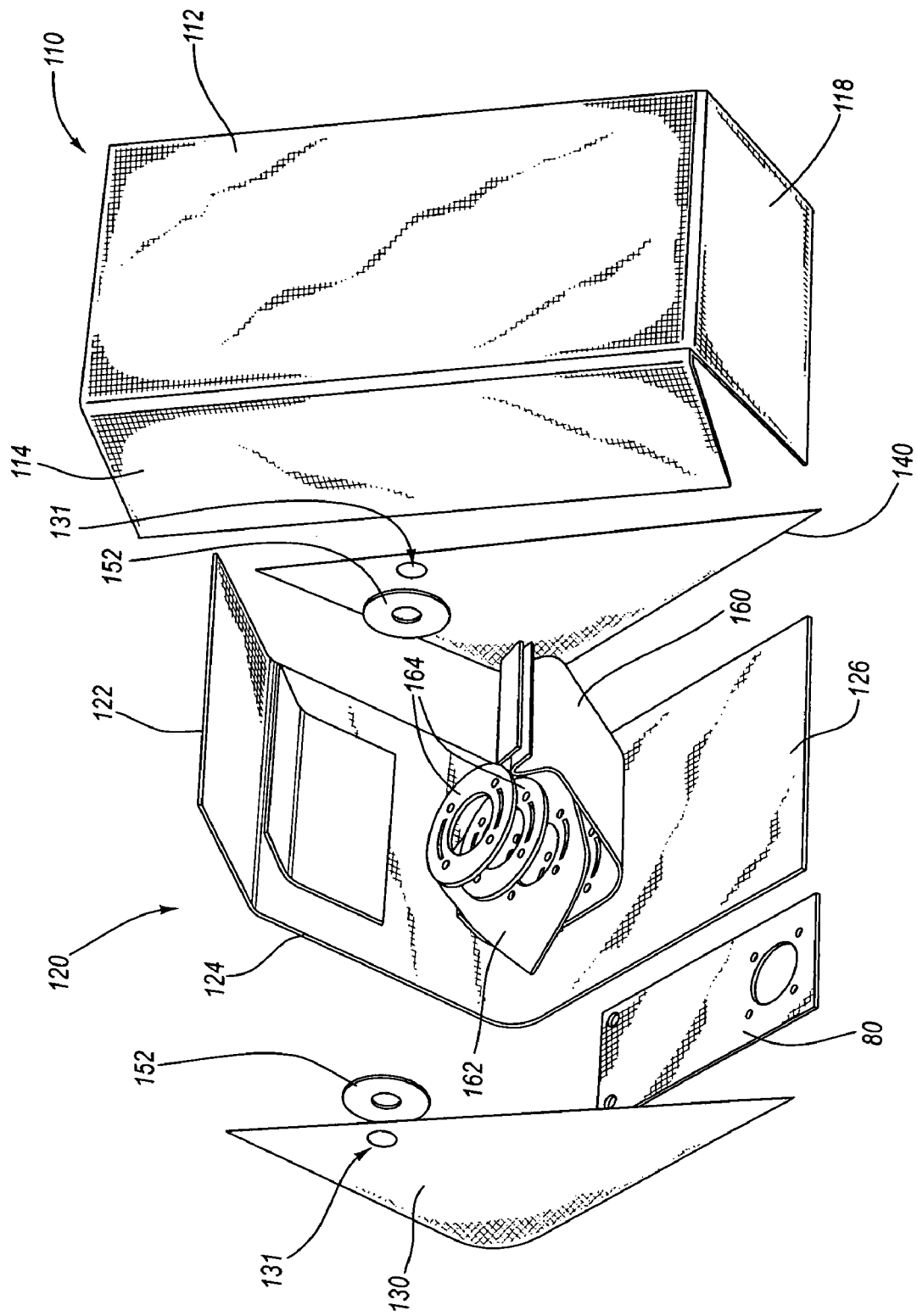
FIG. 3 is an exploded perspective view showing the panels and other components of an airbag cushion.

With reference to the accompanying figures, specific embodiments of the invention will now be described in greater detail. FIG. 1 depicts an exploded view of an airbag cushion 100 having four primary panels. Airbag cushion 100 includes a front panel 110, a rear panel 120, a first side panel 130, and a second side panel 140. Front panel 110 includes a substantially rectangular front face 112 and further includes first and second substantially rectangular front panel side faces 114 and 116, respectively. First front panel side face 114 is positioned opposite from second front panel side face 116. Front panel 110 also includes a substantially rectangular bottom face 118, as best seen in FIG. 3.

It should be understood that, whereas the embodiment shown in FIG. 1 has various faces which are integral with the front panel, it is contemplated that other embodiments may have faces which are attached to one another to comprise the front panel. This is, of course, also true for any of the other panels and/or embodiments discussed herein.

Rear panel 120 includes a top face 122, an upper rear face 124, and a lower rear face 126. Note that rear panel 120 comprises a single piece of substantially rectangular material that has been reconfigured such that it has three faces. Reconfiguring the rear panel such that is has more than one face may be accomplished in a number of ways. For example, the rear panel may be partially folded along one or more lines. Alternatively, two or more separate pieces of material may be attached together, each of which may make up a separate face of the rear panel. This is, of course, true for the front panel as well. The front panel may be folded along one or more lines to form the various faces or, alternatively, separate pieces of material may be attached together to make up the faces of the front panel. Lower rear face 126 includes an inflator opening 127, which is adapted to receive an inflator (not shown).

First side panel 130 and second side panel 140 are each substantially triangular in shape. Second side panel 140 is positioned opposite from the first side panel 130. One or both of the triangular side panels may include a vent opening, such as vent opening 131, as shown in FIG. 1. As will be discussed in greater detail below, first side panel 130 may be approximately the same size and shape as the second side panel 140. In such embodiments, the first and second side panels can be nested together into a substantially rectangular shape, as also discussed in greater detail below.

As can be seen in FIG. 1, a first side 132 of first side panel 130 is attached to rear panel 120 along a side of lower rear face 126. A second side 134 of first side panel 130 is attached to rear panel 120 along a side of upper rear face 124. The third side 136 of first side panel 130 is attached to front panel 110 along a side of front panel side face 114. Second side panel 140 is attached to the other panels in a similar matter. Specifically, one side of second side panel 140 is attached to rear panel 120 along a side (opposite from the side at which first side panel 130 is attached to lower rear face 126) of lower rear face 126. Likewise, another side of second side panel 140 is attached to rear panel 120 along a side of upper rear face 124, and the third side of second side panel 140 is attached to front panel 110 along a side of front panel side face 116. Rear panel top face 122 is attached to the front panel along the top portions of front face 112, side face 114, and side face 116. Similarly, bottom face 118 is attached along the bottom portions of side face 114, side face 116, and lower rear face 126. Bottom face 118 may be folded from, or attached to, front face 112. Those having ordinary skill in the art will appreciate that the various panels/faces may be attached to one another in a variety of ways, such as by way of sewing, adhesives, welding, staples, or any other similar connection seam methodology and/or structure for attaching two panels together.

Figure 2:
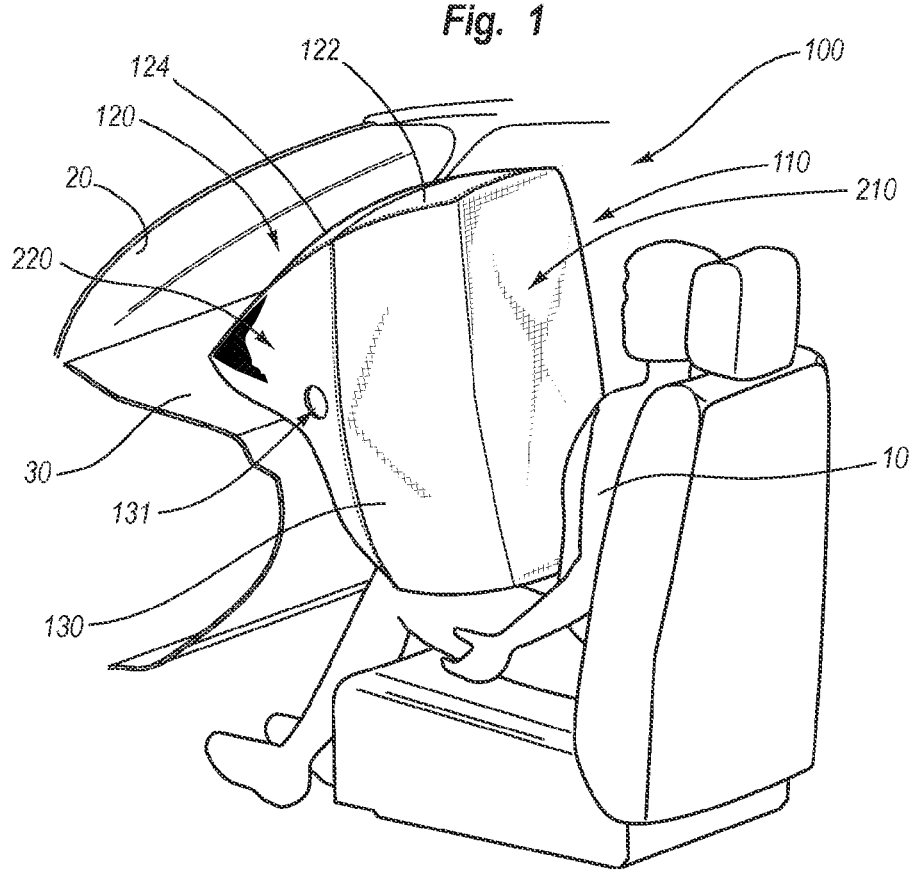
FIG. 2 is a perspective view showing an airbag cushion being inflated in an automobile.

FIG. 2 depicts airbag cushion 100 installed in an automobile and in an inflated state. As can best be seen in this figure, the airbag consists of two functional volumes. A restraint volume 210 is defined by the folded front panel 110 and the top face 122 of the rear panel 120. The restraint volume 210 interacts with the occupant 10 and provides the bulk of the restraint. A space-filling volume 220 is positioned behind the restraint volume 210 relative to the occupant 10 and is defined by the upper and lower rear faces 124 and 126 (lower rear face 126 is not visible in FIG. 2), respectively, and the two triangular side panels 130 and 140. Volume 220 is substantially wedge-shaped and it occupies the space between the vehicle windshield 20 and the instrument panel 30. In this manner, volume 220 can act as a support for volume 210 and can create cross-car stability during inflation and restraint.

As seen in FIG. 3, front panel 110 may consist of a substantially rectangular shape having two corners removed. Front panel 110 may alternatively be described as consisting of a substantially rectangular shape (making up front face 112 and side faces 114 and 116 (side face 116 is not visible in FIG. 3) in the finished airbag cushion) with a substantially rectangular flap (making up bottom face 118 in the finished airbag cushion) extending from approximately the center of one side of the front panel 110. Side faces 114 and 116, and bottom face 118, are each formed by folding front panel 110 along straight lines in three places (two parallel and one perpendicular to the other two). Rear panel 120, may consist of a substantially rectangular shape folded along straight lines in two places to form top face 122, upper rear face 124, and lower rear face 126. Side panels 130 and 140 are each substantially triangular in shape, and may also be of substantially the same size and shape as one another such that they can be nested together into a substantially rectangular shape.

As also shown in FIG. 3, the airbag cushion 100 may also include one or more vent reinforcements 152, which are typically positioned around vent opening(s) 131. One or more tethers may also be attached to the interior of any of the various panels. In airbag cushion 100, tether 160 is attached to the lower rear face 126 of rear panel 120. Tether 160 may extend and be attached to the front panel 110, so as to assist in restraining the inflation size of the airbag cushion 100. Airbag cushion 100 may further include a heat shield 162, along with one or more doublers 164 to provide additional reinforcement. The heat shield 162 and doublers 164 are positioned around the inflator opening 127. A wrapper 80 may be used to constrain the airbag cushion 100 in a folded and/or rolled configuration for storage in the vehicle.

Some embodiments of the invention may be configured such that the panels are composed of a woven material. In such embodiments, as illustrated by the shadowed portions of FIGS. 1-3, first yarns 200a in the front and/or rear woven panels may be configured to extend approximately laterally relative to an occupant following inflation of the airbag cushion and second yarns 200b to extend approximately vertically relative to the occupant following inflation of the airbag cushion. Such embodiments may further be configured such that the side panels each have first yarns 202a extending at an angle relative to both the first and second yarns 200a, 200b of the front and/or rear panels following inflation of the airbag cushion.

The yarns 200a in the rectangular panels 110, 120 of the aforementioned embodiments may run longitudinally with the car, i.e., from the attachment point directly towards the occupant. These embodiments may thereby provide for a deployment configuration wherein there is no or only a small angle between a first set of yarns 200a in the front and/or rear panels and the airbag deployment direction. As such, it is thought that stretching may occur in the yarns of the front and/or rear panels, but there will not be significant shifting among the yarns relative to each other. Because the triangular side panels, on the other hand, are positioned at an angle relative to the occupant (and relative to the deployment direction), the yarns in the side panels are allowed to move or shift relative to each other.

The angles at which the yarns of the side panels extend from the yarns of the front and/or rear panels may vary. However, in one embodiment, the angles at which the first yarns 200a of the front and/or rear panels extend from the first yarns 202a and second yarns 202b of the side panels following inflation of the airbag cushion are at least about thirty degrees. In another embodiment, the angles at which the first yarns 200a of the front and/or rear panels extend from the first and second yarns 202a, 202b of the side panels following inflation of the airbag cushion are about forty-five degrees.

Figure 5:
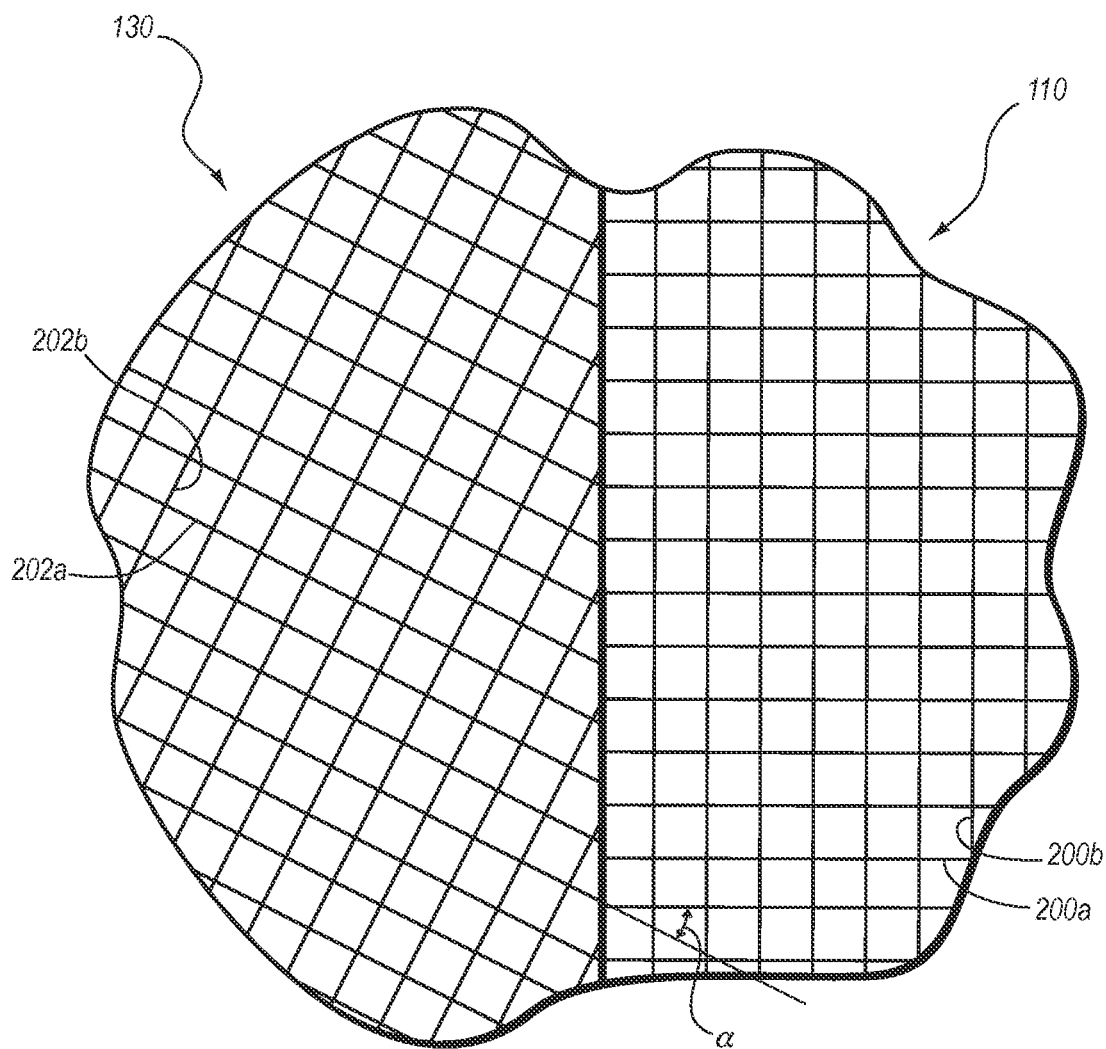
FIG. 5 is a schematic view of a front panel and a side panel.

As one skilled in the art will appreciate from at least the foregoing disclosure, FIG. 5 illustrates a schematic view of the front panel 110 and the side panel 130. The front panel 110 has first yarns 200a and second yarns 200b. The side panel 130 has first yarns 202a and second yarns 202b. The first yarns 200a of the front panel 110 extend from the first yarns 202a of the side panel 130 at an angle α. In some embodiments, the angle α can be at least about thirty degrees. In another embodiment, the angle α can be about forty-five degrees.

In some embodiments of the invention, the various panels/faces may be configured such that the minimum distance from the inflator opening to the connection seams between panels/faces is substantial so as to reduce burn-through and other similar problems that typically occur in the area near the inflator. In one embodiment, the minimum distance d (see FIG. 1) from the center of the inflator opening to a connection seam is at least about 140 mm. In another embodiment, the minimum distance d from the center of the inflator opening to a connection seam is at least about 150 mm. In still another embodiment, the minimum distance d from the center of the inflator opening to a connection seam is at least about 160 mm. In yet another embodiment, the minimum distance d from the center of the inflator opening to a connection seam is at least about 170 mm. In still another embodiment, the minimum distance d from the center of the inflator opening to a connection seam is at least about 200 mm. In another embodiment, the minimum distance d from the center of the inflator opening to a connection seam is at least about 220 mm. In some embodiments, including any of the various embodiments discussed above, the front face may have a width approximately equal to the width of the rear panel.

In some embodiments, the airbag cushion may be configured such that the first and second side panels stretch during inflation to a significantly greater degree than the front and rear panels. In this manner, the airbag cushion may tend to curve around the occupant during deployment. This may be attributable in some embodiments to the fact that only panels positioned on the sides of the airbag cushion will stretch to a significant degree, with the top and bottom portions of the airbag maintaining a fairly inflexible state during inflation. Embodiments in which the yarns in the side panels are offset or angled relative to the yarns in the front and/or rear panels, as described above, may be used to provide this configuration.

Figure 4A:
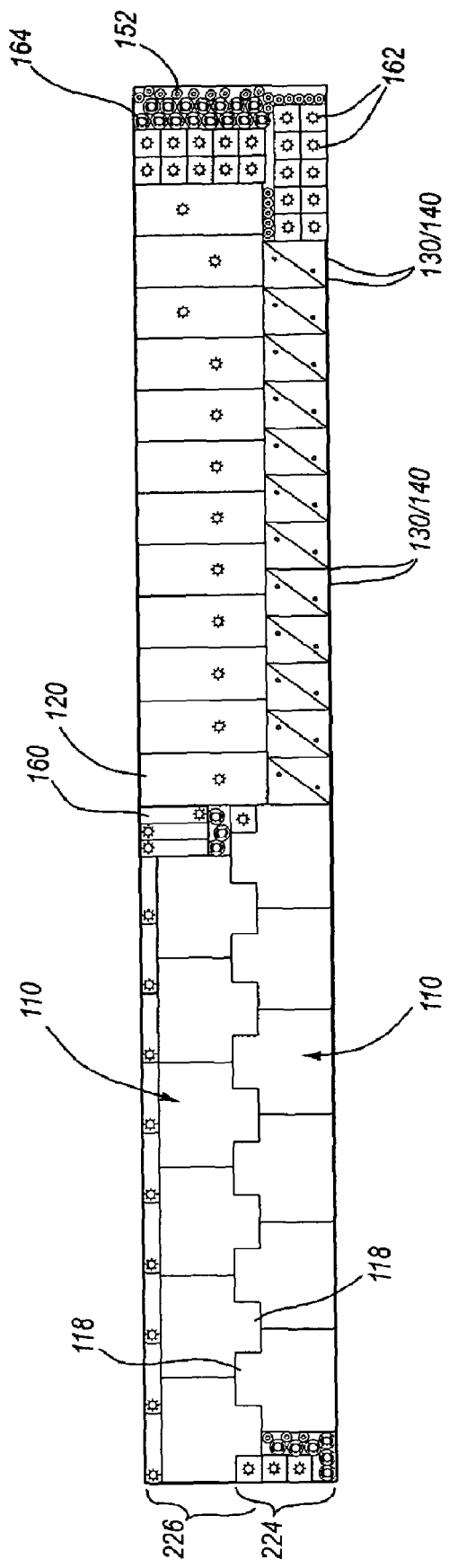
FIG. 4A is a top plan view of a fabric roll including panels used to manufacture an airbag cushion.
Figure 4B:
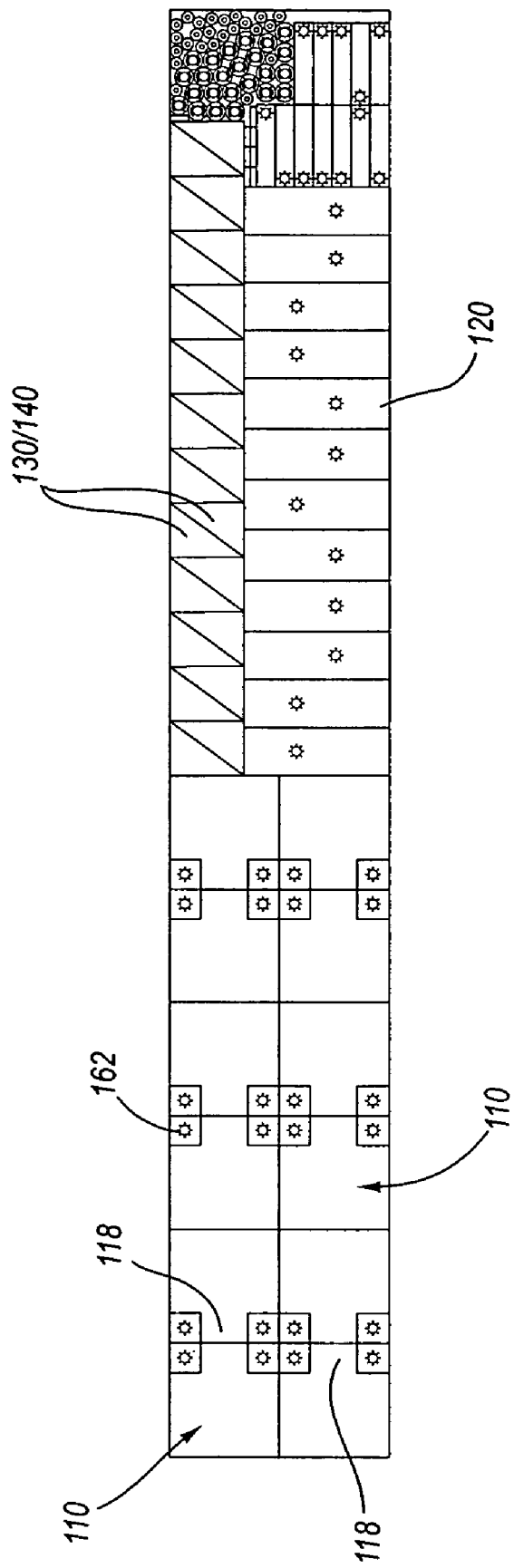
FIG. 4B is a top plan view of an alternative fabric roll including panels used to manufacture an airbag cushion.

FIGS. 4A and 4B depict fabric rolls used in manufacturing particular embodiments of the invention described herein and illustrate how some of the shapes utilized by embodiments of the invention can allow for efficient nesting patterns to minimize waste of fabric material in mass-producing airbag cushions. In FIG. 4A, a nesting pattern is shown in which side panels 130 and 140 are nested together to form substantially rectangular shapes. Rear panels 120 are nested vertically adjacent to the side panels and, in the depicted embodiments, consist of rectangular shapes having approximately the same width as the rectangles formed by nesting the side panels together.

Additionally, front panels 110 are nested together with a plurality of front panels 110 in a first row 224 abutting one another and a plurality of front panels 110 in a second row 226 abutting one another. As depicted in the figure, the front panels 110 in the second row 226 are offset and upside down relative to the front panels 110 in the first row 224 and offset, such that each of the flaps (to be used to form bottom faces 118) from front panels 110 in the first row 224 fits within the gaps between flaps 118 from front panels 110 in the second row 226, and vice versa. As can also be seen from the figure, various other elements, such as tethers 160, heat shields 162, doublers 164, and vent reinforcements 152 can be nested above, below, between, next to, or otherwise among the panel elements.

In the fabric roll depicted in FIG. 4B, an alternative nesting pattern is depicted. This embodiment differs from that of FIG. 4A in that the front panels 110 are not offset from one another. Instead, the front panels 110 are positioned to face one another with the flaps 118 positioned directly opposite from one another rather than interdigitated with one another. Heat shields 162 are positioned in the gaps between flaps 118.

Without further elaboration, it is believed that one skilled in the art can use the preceding description to utilize the invention to its fullest extent. The examples and embodiments disclosed herein are to be construed as merely illustrative and not a limitation of the scope of the present invention in any way. It will be apparent to those having skill in the art that changes may be made to the details of the above-described embodiments without departing from the underlying principles of the invention. In other words, various modifications and improvements of the embodiments specifically disclosed in the description above are within the scope of the appended claims. The scope of the invention is therefore defined by the following claims.

The invention claimed is:

1. An airbag cushion configured to be inflated, wherein, upon inflation, the airbag comprises:
    a front panel comprising a set of first yarns, the front panel defining a front face in which the first yarns extend approximately laterally relative to a vehicle occupant location, the front panel further defining a first side face and a second side face that extend rearwardly from the front face, wherein the front face and the first and second side faces at least partially define a first volume, and wherein in the first and second side faces the first yarns extend substantially directly toward the vehicle occupant location;
    a first side panel having a first edge attached to the first side face of the front panel, wherein the first side panel includes a set of second yarns that are angled with respect to the first yarns in the first side face such that the first yarns and second yarns are non-parallel to each other;
    a second side panel having a first edge attached to the second side face of the front panel, wherein the second side panel includes a set of third yarns that are angled with respect to the first yarns of the second side face such that the first yarns and the third yarns are non-parallel to each other; and
    a rear panel attached to the first side panel and the second side panel such that the rear panel and the first and second side panels at least partially define a second volume, wherein the first and second side panels are configured to stretch more than the front panel such that the second volume acts as a support to the first volume.

2. The airbag cushion of claim 1, wherein each of the front face, the first side face, and the second side face is substantially rectangular, and wherein the first and second side faces are positioned opposite from one another.

3. The airbag cushion of claim 2, wherein the front panel further comprises a substantially rectangular bottom face and wherein the front panel bottom face is connected to the rear panel.

4. The airbag cushion of claim 1, wherein the rear panel comprises a top face, wherein the rear panel top face is connected to the front panel.

5. The airbag cushion of claim 1, wherein the rear panel defines an inflator opening.

6. The airbag cushion of claim 1, wherein the rear panel is attached to both a top edge and a bottom edge of the front panel.

7. The airbag cushion of claim 1, wherein each of the first and second side panels is substantially triangular.

8. The airbag cushion of claim 1, wherein the first volume is between the second volume and the vehicle occupant location.

9. An airbag cushion comprising:
    a front panel comprising a first unitary piece of material having a set of first yarns;
    a first side panel connected with the front panel, wherein the first side panel comprises a second piece of material distinct from the first piece of material, wherein the second piece of material comprises a set of second yarns that extend at an angle of at least about 30 degrees relative to the set of first yarns of the front panel; and
    a second side panel connected with the front panel, wherein the second side panel comprises a third piece of material distinct from the first and second pieces of material, wherein the third piece of material comprises a set of third yarns that extend at an angle of at least about 30 degrees relative to the set of first yarns of the front panel, wherein the airbag is configured to be inflated such that the first yarns of the front panel include a first portion that runs substantially laterally relative to a car, and the first yarns of the front panel further include second and third portions that run substantially longitudinally relative to the car such that the first, second, and third portions of the first yarns at least partially define a first volume, and wherein the first and second side panels at least partially define a second volume that is configured to expand to a greater degree than the first volume.

10. The airbag cushion of claim 9, wherein the first and second side panels are approximately the same size and shape.

11. The airbag cushion of claim 9, wherein each of the panels are made from the same material.

12. The airbag cushion of claim 9, wherein the second yarns extend at an angle of about 45 degrees relative to the first yarns.

13. The airbag cushion of claim 9, wherein the front panel comprises first and second substantially rectangular side faces.

14. The airbag cushion of claim 13, wherein the front panel further comprises a substantially rectangular bottom face.

15. The airbag cushion of claim 9, piece of material of the further comprising a rear panel that substantially defines a rectangle, wherein the rear panel comprises yarns that run substantially parallel to two sides of the rectangle and yarns that run substantially parallel to two other sides of the rectangle.

16. The airbag cushion of claim 15, wherein the rear panel comprises a top face, wherein the top face is connected to the front panel.

17. An airbag cushion configured to be deployed such that, when deployed, the airbag comprises,
    a front face, a first side face, a second side face, and a top face that cooperate to at least partially define a first volume, wherein each of the front, first side, second side, and top faces is substantially rectangular; and
    a substantially triangular first side panel connected to the first side face, a substantially triangular second side panel connected to the second side face, and at least a portion of a rear panel connected with the first and second side panels, wherein the first side panel, the second side panel, and the rear panel cooperate to define a second volume, wherein each of the first and second side faces comprises a set of first yarns that are substantially parallel to a plane defined by the top face, and wherein each of the first and second side panels comprises two sets of yarns that are perpendicular to one another and that are non-parallel to the plane defined by the top face such that the first and second side panels are configured to stretch more than the first and second side faces during restraint of a vehicle occupant.

18. The airbag cushion of claim 17, wherein the first side panel is approximately the same size and shape as the second side panel.

19. The airbag cushion of claim 17, wherein the rear panel is connected to the front face.

20. The airbag cushion of claim 17, wherein the rear panel comprises a set of yarns that are substantially parallel to a plane defined by the first side face.

21. The airbag cushion of claim 17, wherein the rear panel includes three substantially rectangular faces.

22. The airbag cushion of claim 17, wherein the side panels are substantially parallel to each other following deployment of the airbag cushion.

23. The airbag cushion of claim 17, wherein a set of yarns of the first side panel extends from the first yarns of the first side face at an angle of at least about thirty degrees.

24. The airbag cushion of claim 23, wherein the angle at which the set of yarns of the first side panel extends from the first yarns of the first side face is about forty-five degrees.

25. The airbag cushion of claim 17, wherein the first side face and the first side panel are substantially coplanar and the second side face and the second side panel are substantially coplanar.

26. A method for constructing an airbag cushion, comprising:

providing a first substantially triangular side panel;

providing a second substantially triangular side panel, wherein the second side panel is approximately the same size and shape as the first side panel such that the first and second side panels can be nested together into a substantially rectangular shape;

providing a substantially rectangular rear panel;

providing a front panel having a flap, the front panel shaped such that multiple front panels can be nested together by positioning a plurality of front panels in a first row abutting one another and a plurality of front panels in a second row abutting one another, wherein the front panels in the second row are offset and upside down relative to the front panels in the first row, such that a flap of a front panel in the first row fits within a gap between flaps of front panels in the second row and a flap of a front panel in the second row fits within a gap between flaps of front panels in the first row;

reconfiguring the rear panel such that it has at least two faces;

connecting the first side panel to the rear panel and the front panel; and connecting the second side panel to the rear panel and the front panel such that the first side panel is positioned opposite from the second side panel.

27. The method of claim 26, wherein the step of reconfiguring the rear panel is done by partially folding the rear panel.

28. The method of claim 27, wherein the rear panel is reconfigured such that it has at least three faces, and wherein the step of reconfiguring the rear panel is done by partially folding the rear panel along two separate lines.

29. The method of claim 26, wherein the front panel comprises a substantially rectangular piece of material having a substantially rectangular flap extending from approximately the center of one side of the substantially rectangular piece of material.

30. The method of claim 26, further comprising a step of reconfiguring the front panel so as to form a first side portion, a second side portion, and a front face portion.

31. The method of claim 30, wherein the step of reconfiguring the front panel is done by folding the front panel along a first line and a second line such that the front face portion is defined by the first line and the second line.

* * * * *